(12) United States Patent
Vempati et al.

(10) Patent No.: US 11,680,005 B2
(45) Date of Patent: Jun. 20, 2023

(54) FEED MATERIAL FOR PRODUCING FLINT GLASS USING SUBMERGED COMBUSTION MELTING

(71) Applicant: Owens-Brockway Glass Container Inc., Perrysburg, OH (US)

(72) Inventors: Udaya Vempati, Perrysburg, OH (US); William Pinc, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 441 days.

(21) Appl. No.: 16/788,631

(22) Filed: Feb. 12, 2020

(65) Prior Publication Data

US 2021/0246061 A1    Aug. 12, 2021

(51) Int. Cl.
| | |
|---|---|
| *C03B 5/225* | (2006.01) |
| *C03B 5/235* | (2006.01) |
| *C03C 3/087* | (2006.01) |
| *C03C 4/00* | (2006.01) |

(52) U.S. Cl.
CPC ............ *C03B 5/2356* (2013.01); *C03B 5/225* (2013.01); *C03C 3/087* (2013.01); *C03C 4/0092* (2013.01); *C03C 2201/50* (2013.01); *C03C 2203/10* (2013.01)

(58) Field of Classification Search
None
See application file for complete search history.

(56) References Cited

U.S. PATENT DOCUMENTS

| | | | |
|---|---|---|---|
| 2,955,948 A | 10/1960 | Silverman | |
| 4,632,687 A * | 12/1986 | Kunkle | C03B 5/14 |
| | | | 65/335 |
| 4,634,461 A * | 1/1987 | Demarest, Jr. | C03B 3/023 |
| | | | 65/335 |
| 5,718,737 A | 2/1998 | Mosch | |
| 6,408,650 B1 | 6/2002 | Boulos et al. | |
| 6,673,730 B1 * | 1/2004 | Shelestak | C03C 4/082 |
| | | | 501/71 |
| 6,927,186 B2 | 9/2005 | Hulme et al. | |

(Continued)

FOREIGN PATENT DOCUMENTS

EP    1118597 A1    7/2001

OTHER PUBLICATIONS

PCT Search Report and Written Opinion, PCT Int. Application No. PCT/US2021/017578, PCT Int. Filing Date: Feb. 11, 2021, Applicant: Owens-Brockway Glass Container Inc., dated May 27, 2021.

Primary Examiner — Jodi C Franklin

(57) ABSTRACT

A method of producing flint glass using submerged combustion melting involves introducing a vitrifiable feed material into a glass melt contained within a submerged combustion melter. The vitrifiable feed material is formulated to provide the glass melt with a glass chemical composition suitable for producing flint glass articles. To that end, the glass melt comprises a total iron content expressed as $Fe_2O_3$ in an amount ranging from 0.04 wt % to 0.06 wt % and also has a redox ratio that ranges from 0.1 to 0.4, and the vitrifiable feed material further includes between 0.008 wt % and 0.016 wt % of selenium or between 0.1 wt % and 0.2 wt % of manganese oxide in order to achieve an appropriate content of selenium or manganese oxide in the glass melt.

14 Claims, 2 Drawing Sheets

(56) References Cited

U.S. PATENT DOCUMENTS

| | | |
|---|---|---|
| 7,162,892 B2 | 1/2007 | Smith et al. |
| 8,196,432 B2 | 6/2012 | Jacques et al. |
| 8,222,170 B2 | 7/2012 | Ikenishi et al. |
| 8,357,459 B2 | 1/2013 | Tachiwana et al. |
| 8,785,337 B2 | 7/2014 | Barton et al. |
| 9,324,894 B2 * | 4/2016 | Dogimont ................ G02B 5/08 |
| 2002/0162358 A1 * | 11/2002 | Jeanvoine ............. C03B 5/2257 |
| | | 65/135.1 |
| 2004/0102304 A1 * | 5/2004 | Boulos .................... C03C 3/087 |
| | | 501/71 |
| 2004/0168474 A1 * | 9/2004 | Jeanvoine ............... C03B 5/173 |
| | | 65/121 |
| 2004/0168475 A1 * | 9/2004 | Jeanvoine ................ C03B 3/00 |
| | | 65/178 |
| 2004/0224833 A1 * | 11/2004 | Jeanvoine ................ C03C 4/02 |
| | | 501/71 |
| 2007/0122332 A1 * | 5/2007 | Jacques .................... C03C 1/02 |
| | | 423/334 |
| 2007/0212546 A1 | 9/2007 | Jeanvoine et al. |
| 2007/0213196 A1 * | 9/2007 | Jones ........................ C03C 4/02 |
| | | 501/71 |
| 2008/0096754 A1 | 4/2008 | Thomsen et al. |
| 2008/0103039 A1 | 5/2008 | Jones |
| 2012/0058880 A1 * | 3/2012 | Shelestak ............... C03C 4/0092 |
| | | 65/99.2 |
| 2012/0234368 A1 * | 9/2012 | Cintora ............... H01L 31/0392 |
| | | 136/262 |
| 2013/0313671 A1 * | 11/2013 | Cintora ............. H01L 31/03925 |
| | | 257/432 |
| 2014/0017499 A1 | 1/2014 | Yamamoto |
| 2015/0166403 A1 | 6/2015 | Yamamoto |
| 2015/0232363 A1 * | 8/2015 | Solvang .................. C03B 5/235 |
| | | 110/182.5 |
| 2015/0307389 A1 | 10/2015 | He et al. |
| 2016/0194238 A1 * | 7/2016 | Naylor ................. C03C 4/0092 |
| | | 65/99.6 |
| 2018/0305240 A1 * | 10/2018 | Ashton-Patton ....... C03C 21/002 |
| 2019/0256403 A1 * | 8/2019 | Lönnroth ............ C03C 10/0054 |
| 2019/0284076 A1 * | 9/2019 | Wang ........................ C03B 5/04 |
| 2019/0284079 A1 * | 9/2019 | Wang ....................... C03C 1/004 |
| 2020/0087187 A1 * | 3/2020 | Ashton-Patton ....... C03C 4/0092 |
| 2021/0155521 A1 * | 5/2021 | Baret ........................ C03B 1/02 |
| 2022/0098078 A1 * | 3/2022 | Rashley ................ C03B 5/2356 |

* cited by examiner

FEED MATERIAL FOR PRODUCING FLINT GLASS USING SUBMERGED COMBUSTION MELTING

The present disclosure is directed to the production of flint glass using submerged combustion technology.

BACKGROUND

Glass is a rigid amorphous solid that has numerous applications. Soda-lime-silica glass, for example, is used extensively to manufacture flat glass articles, such as windows, hollow glass articles including containers such as bottles and jars, as well as tableware and other specialty articles. Soda-lime-silica glass comprises a disordered and spatially crosslinked ternary oxide network of $SiO_2$—$Na_2O$—$CaO$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the $CaO$ component functions as a stabilizer that improves certain physical and chemical properties of the glass including its hardness and chemical resistance. The inclusion of $Na_2O$ and $CaO$ in the chemistry of soda-lime-silica glass renders the commercial manufacture of glass articles more practical and less energy intensive while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % $CaO$.

In addition to $SiO_2$, $Na_2O$, and $CaO$, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-silica glass besides $SiO_2$, $Na_2O$, and $CaO$, the sum total of those additional materials is preferably 10 wt % or less, or more narrowly 5 wt % or less, based on the total weight of the soda-lime-silica glass.

Soda-lime-silica glass has long been produced in a continuous melting furnace. When operating such a furnace, a vitrifiable feed material is fed as a batch blanket on top of a large molten glass bath of a generally constant level contained in a melting chamber of the furnace. The molten glass bath is maintained at a temperature of about 1450° C. or greater so that the added blanket of feed material can melt, react, and progress through several intermediate melt phases before becoming chemically integrated into the molten glass bath as the bath moves slowly through the melting chamber of the furnace towards a refining chamber located downstream of the melting chamber. In the refining chamber, entrained gas bubbles and dissolved gases are removed from the molten glass bath to yield refined molten glass that is further homogenized or conditioned in a forehearth in preparation for glass forming operations. The molten glass bath has conventionally been heated within the melting chamber by non-submerged burners that combust a mixture of fuel and oxidant within an open combustion zone atmosphere located above the molten glass bath. The burners are located in burner ports on opposite sidewalls of the refractory superstructure that partially defines the combustion zone (cross fired furnace) or in a back wall of the refractory superstructure (end port fired furnace). It typically takes 24 hours or longer for a unit of vitrifiable feed material to melt and react through a conventional glass melting and fining operation before exiting the melter as an equivalent unit of refined molten glass.

The finished glass article—such as a container, flat glass product, or tableware—is sometimes required to be colorless or nearly colorless. Colorless or nearly colorless glass is typically referred to in the industry as "flint" glass. To produce flint molten glass in a conventional continuous melting furnace, the vitrifiable feed material fed to the furnace is carefully formulated to minimize iron impurities and/or to mask the color tint caused by iron impurities. In general, certain components of the feed material may contain iron impurities—notably, sand, limestone, dolomite, and recycled glass. The iron may be present in two forms within the molten glass: (1) the ferrous or reduced state ($Fe^{2+}$ as FeO) or (2) the ferric or oxidized state ($Fe^{3+}$ as $Fe_2O_3$). Iron in the $Fe^{2+}$ state imparts a blue-green color to the molten glass and iron in the $Fe^{3+}$ states imparts a yellow-green color. The ratio of $Fe^{2+}$ to total iron ($Fe^{2+}$+$Fe^{3+}$) in the molten glass determines the redox ratio of the glass and gives a general indication of whether the blue-green color or the yellow-green color will dominate visually. In that regard, when seeking to attain flint glass, a lower redox ratio is usually desired since the yellow-green color is less visually apparent and easier to mask with decolorants. A low redox ratio can be achieved by adding oxidizing agents into the feed material to shift the $Fe^{2+}/Fe^{3+}$ equilibrium in the molten glass towards the $Fe^{3+}$ state and/or by including a substantial amount of recycled flint glass in the vitrifiable feed material to dilute the iron impurities contained in the virgin raw material components of the feed material.

Submerged combustion (SC) melting is a melting technology that is also capable of producing glass, including soda-lime-silica glass, and has recently gained interest as a potentially viable alternative to the melting process employed in a conventional continuous melting furnace. Contrary to conventional melting practices, SC melting involves injecting a combustible gas mixture that contains fuel and an oxidant directly into a glass melt contained in a melter, typically though submerged burners mounted in the floor or sidewalls of the melter and immersed by the glass melt. The oxidant may be oxygen, air, or any other gas that contains a percentage of oxygen. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the molten glass compared to the slower kinetics of a conventional melting furnace in which the molten glass bath is heated primarily with radiant heat from overhead non-submerged burners. And while SC technology can melt and integrate the vitrifiable feed material into the glass melt relatively quickly, the glass melt tends to be foamy and have a relatively low-density despite being chemically homogenized when discharged from the melter. Indeed, the glass melt in an SC melter may include anywhere from 30 vol % to 60 vol % of entrained gas bubbles.

SC melting has not been incorporated into past commercial glass manufacturing operations that mass-produce container and float glass articles for a number of reasons. Apart from the challenges associated with fining a low-density foamy molten glass output and the durability of the burners, legacy vitrifiable feed material formulations specifically tailored to produce flint glass are not as reliable in actually producing flint glass when extended to SC melting. The reason for this discrepancy is believed to be related to the fundamentally different way in which the vitrifiable feed material is melted within a turbulent glass melt contained in an SC melter. In SC melting, as explained above, combustion products are discharged from submerged burners directly into a turbulent glass melt, whereas in conventional legacy processes combustion products are discharged into an open atmosphere above a much calmer molten glass bath. The discharge of substantial quantities of combustion product gases through the glass melt and its resultant impact on the chemistry of the melt is believed to be the underlying reason why legacy feed material formulations do not necessarily translate to SC melting. Due to the absence of proven feed material and glass compositions tailored for flint glass, SC melting operations to produce flint glass, especially soda-lime-silica flint glass, that consistently meets strict color specifications have yet to be devised.

SUMMARY OF THE DISCLOSURE

The present disclosure relates to a vitrifiable feed material composition and a resultant glass chemical composition of a glass melt derived therefrom that may be employed in conjunction with submerged combustion melting to produce flint glass. The vitrifiable feed material includes a base glass portion, an oxidizing agent, and a decolorant. The base glass portion contributes the primary glass-forming oxides of the glass chemical composition. With regards to soda-lime-silica glass, for example, the base glass portion contributes the necessary amounts of $SiO_2$, $Na_2O$, $CaO$, as well as $Al_2O_3$ if desired. The oxidizing agent is a compound that has an oxidizing effect on the glass and, therefore, shifts the $Fe^{2+}/Fe^{3+}$ equilibrium towards the $Fe^{3+}$ state, thus reducing the redox ratio and driving the glass more towards a yellow-green color as opposed to a blue-green color. A preferred oxidizing agent that may be included in the vitrifiable feed material is a sulfate compound. Lastly, the decolorant is a compound that masks the color tint attributable to iron by absorbing visible light in the blue/green wavelengths (450 nm to 565 nm) and transmitting visible light in the yellow/red wavelengths (565 nm to 740 nm). Shifting the perceptible glass color towards the yellow hue has the effect of decolorizing the glass since a yellow hue is significantly less visually apparent than a blue or green hue. The decolorant may be selenium and/or manganese oxide (MnO).

The vitrifiable feed material is formulated specifically to produce flint glass by way of submerged combustion melting. Indeed, as will be explained in more detail below, the amounts of the oxidizing agent and the decolorant included in the vitrifiable feed material along with the base glass portion cannot be borrowed from legacy glassmaking operations in which the feed material is spread as a batch blanket on top of a slow-moving molten glass bath that is heated radiantly from above by non-submerged burners; rather, the composition of the vitrifiable feed mixture is selected in view of the peculiar nature of submerged combustion melting and to accommodate various kinetic and chemical mechanisms that simply do not occur in a legacy continuous melting furnace. By adapting the composition of the vitrifiable feed material to better align with the peculiarities of submerged combustion melting, the molten glass obtained from the SC melter can consistently meet exacting flint glass specifications that are often mandated by the commercial container and flat glass articles industries. The disclosed method is particularly capable of producing soda-lime-silica flint glass for eventual forming into glass containers such as, for example, food and beverage bottles and jars.

In the present disclosure, the vitrifiable feed material is introduced into, and immediately intermixed with, a glass melt contained within a submerged combustion melter. The glass melt is agitated by the forceful discharge of combustion products directly into the melt from one or more submerged burners that are combusting a combustible gas mixture comprising a fuel and oxygen. To ensure that flint glass is produced, the glass melt includes 0.06 wt % total iron or less as expressed as $Fe_2O_3$ and has a redox ratio of between 0.1 and 0.4. The prescribed redox ratio is preferably supported by a sulfate content as retained, that is to say dissolved, in the glass melt of between 0.08 wt % and 0.1 wt % as expressed as $SO_3$. Additionally, to mask any color tint attributable to the iron, the glass melt includes between 0.0001 wt % and 0.0003 wt % selenium or between 0.1 wt % and 0.2 wt % manganese oxide. To compensate for conditions that exacerbate volatilization and naturally counteract oxidizing agents, and to ultimately provide the sulfate content and the selenium or manganese oxide content in the glass chemical composition in their respective amounts, the vitrifiable feed material contains 0.20 wt % to 0.50 wt % of the sulfate compound, expressed as $SO_3$, and between 0.008 wt % and 0.016 wt % selenium or between 0.1 wt % and 0.2 wt % manganese oxide.

The present disclosure embodies a number of aspects that can be implemented separately from or in combination with each other to provide a method for producing flint glass. According to one embodiment of the present disclosure, a method of producing flint glass using submerged combustion melting includes several steps. One step involves preparing a vitrifiable feed material that includes a base glass portion that provides primary glass-forming oxides, an oxidizing agent comprising a sulfate compound, and a decolorant comprising either selenium or manganese oxide. The vitrifiable feed material comprises between 0.20 wt % and 0.50 wt % of the sulfate compound, expressed as $SO_3$, and further comprises between 0.008 wt % and 0.016 wt % of selenium or between 0.1 wt % and 0.2 wt % of manganese oxide. Another step of the method involves introducing the vitrifiable feed material into a glass melt contained within a submerged combustion melter. The glass melt comprises a total iron content expressed as $Fe_2O_3$ in an amount ranging from 0.04 wt % to 0.06 wt % and has a redox ratio that ranges from 0.1 to 0.4. The submerged combustion melter includes one or more submerged burners. Yet another step of the method involves discharging combustion products from the one or more submerged burners directly into and through the glass melt to thereby agitate the glass melt while intermixing and melting the vitrifiable feed material into the glass melt.

According to another aspect of the present disclosure, a method of producing soda-lime-silica flint glass using submerged combustion melting includes several steps. One step involves introducing a vitrifiable feed material into a glass melt contained within a submerged combustion melter. The vitrifiable feed material includes a base glass portion, which contributes $SiO_2$, $Na_2O$, and CaO to the glass melt, and either 0.008 wt % to 0.016 wt % of selenium or 0.1 wt % to 0.2 wt % of manganese oxide. Additionally, the glass melt comprises a total iron content expressed as $Fe_2O_3$ in an amount ranging from 0.04 wt % to 0.06 wt % and has a redox ratio that ranges from 0.1 to 0.4. Another step of the method involves discharging combustion products from one or more submerged burners directly into and through the glass melt to thereby agitate the glass melt while intermixing and melting the vitrifiable feed material into the glass melt. Still another step of the method involves discharging molten glass from the submerged combustion melter. The molten glass has a density that ranges from 0.75 gm/cm$^3$ to 1.5 gm/cm$^3$. Yet another step of the method involves forming at least one glass article from the molten glass. The glass article meets flint glass specifications of a dominant wavelength that lies between 572 nm and 578 nm, a brightness above 50%, and a purity below 16%.

According to yet another aspect of the present disclosure, a vitrifiable feed material for producing flint glass by way of a process that uses submerged combustion melting includes a base glass portion, a sulfate compound, and either selenium or manganese oxide. The base glass portion includes an $SiO_2$ contributor, a $Na_2O$ contributor, and a CaO contributor to provide $SiO_2$, $Na_2O$, and CaO, respectively, to an agitated glass melt when melted therein. The sulfate compound is present in an amount ranging from 0.20 wt % to 0.50 wt % expressed as $SO_3$, and the selenium is present in an amount ranging from 0.008 wt % to 0.016 wt % or the manganese oxide is present in an amount ranging from 0.1 wt % to 0.2 wt %, based on the total weight of the vitrifiable feed material.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
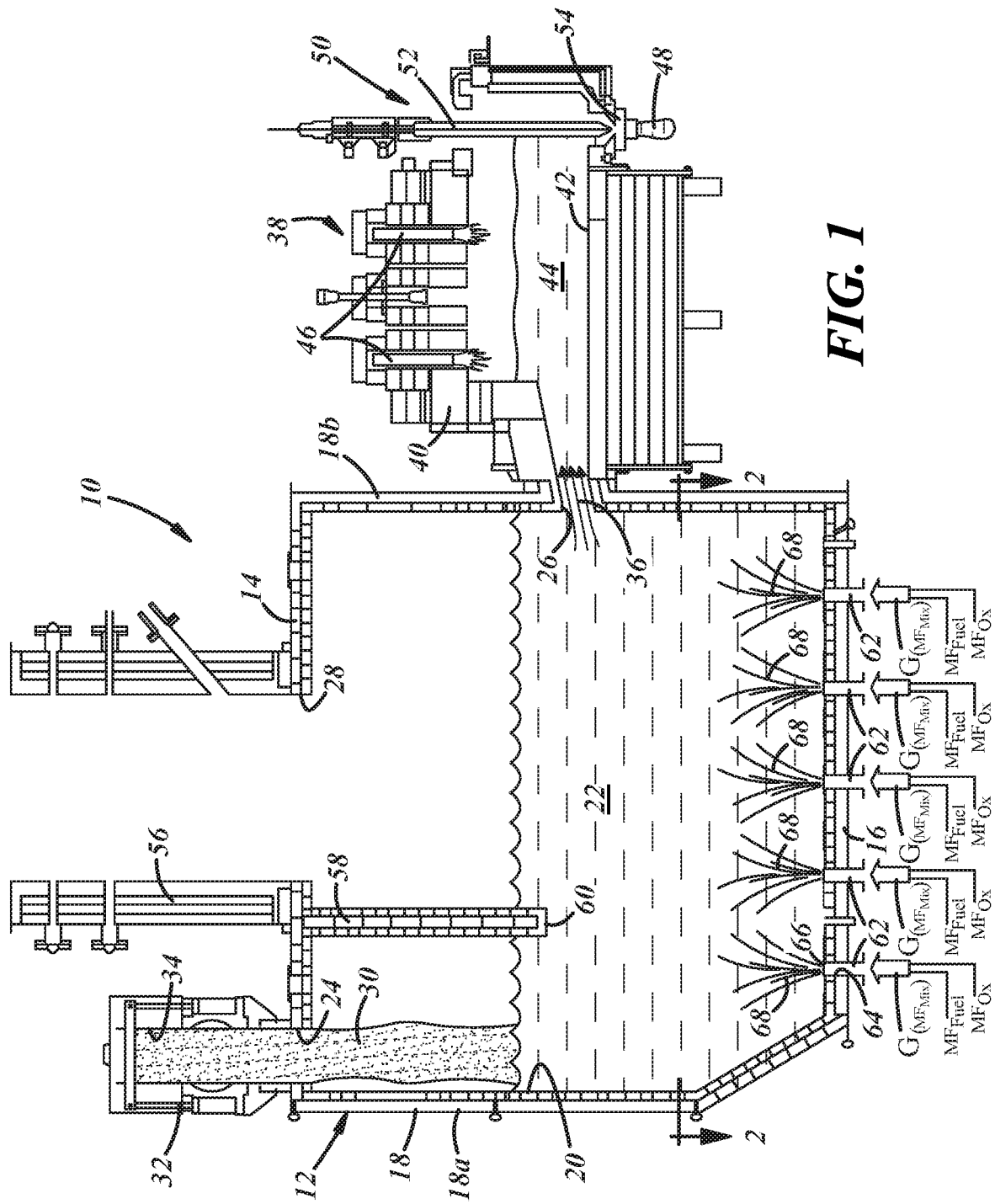
FIG. 1 is an elevated cross-sectional representation of a submerged combustion melter according to one embodiment of the present disclosure.
Figure 2:
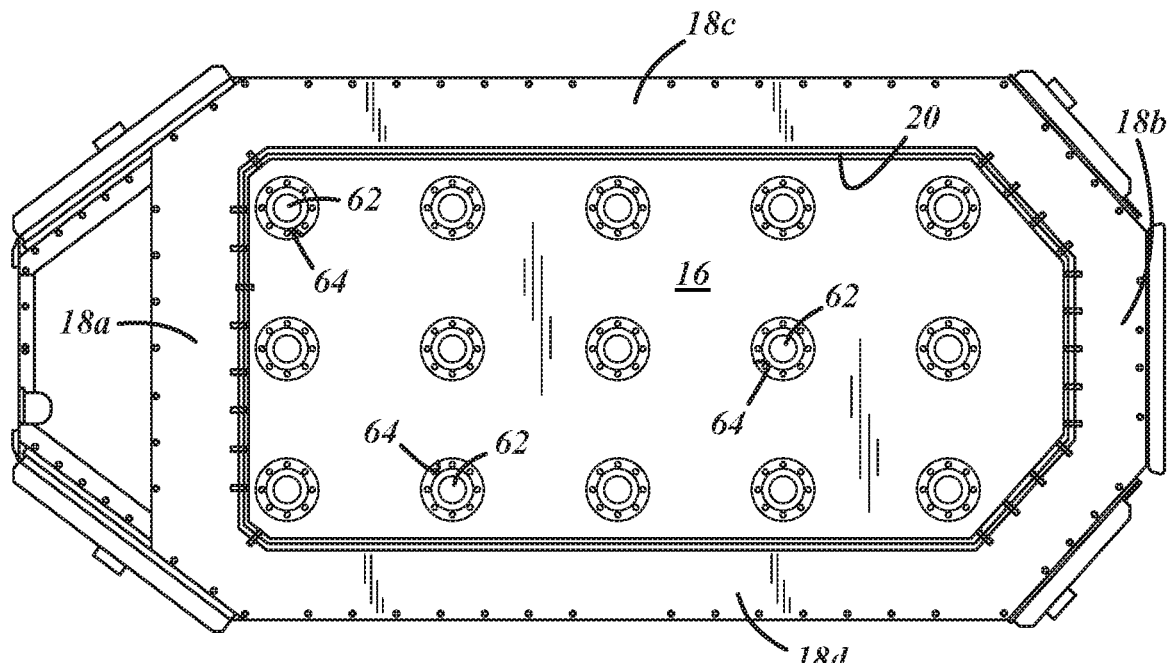
FIG. 2 is a cross-sectional plan view of the submerged combustion melter illustrated in FIG. 1 taken along section line 2-2.

A representative submerged combustion (SC) melter 10 is shown in FIGS. 1-2 to demonstrate the practice described herein for producing flint glass articles. The SC melter 10 includes a housing 12 that has a roof 14, a floor 16, and a surrounding upstanding wall 18 that connects the roof 14 and the floor 16. The surrounding upstanding wall 18 further includes a front end wall 18a, a rear end wall 18b that opposes and is spaced apart from the front end wall 18a, and two opposed lateral sidewalls 18c, 18d that connect the front end wall 18a and the rear end wall 18b. Together, the roof 14, the floor 16, and the surrounding upstanding wall 18 define an interior reaction chamber 20 of the melter 10 that contains a glass melt 22 when the melter 10 is operational. Each of the roof 14, the floor 16, and the surrounding upstanding wall 18 may be constructed to withstand the high temperature and corrosive nature of the glass melt 22. For example, each of those structures 14, 16, 18 may be constructed from a refractory material or one or more fluid cooled panels that support an interiorly-disposed refractory material having an in-situ formed frozen glass layer (not shown) in contact with the glass melt 22.

The housing 12 of the SC melter 10 defines a feed material inlet 24, a molten glass outlet 26, and an exhaust vent 28. Preferably, as shown best in FIG. 1, the feed material inlet 24 is defined in the roof 14 of the housing 12 proximate the front end wall 18a, and the molten glass outlet 26 is defined in the rear end wall 18b of the housing 12 above the floor 16, although other locations for the feed material inlet 24 and the molten glass outlet 26 are certainly possible. The feed material inlet 24 provides an entrance to the interior reaction chamber 20 for the delivery of a vitrifiable feed material 30. A batch feeder 32 that is configured to introduce a metered amount of the feed material 30 into the interior reaction chamber 20 may be coupled to the housing 12. And while many designs are possible, the batch feeder 32 may, for example, include a rotating screw (not shown) that rotates within a feed tube 34 of a slightly larger diameter that communicates with the feed material inlet 24 to deliver the feed material 30 from a feed hopper into the interior reaction chamber 20 at a controlled rate.

The molten glass outlet 26 provides an exit from the interior reaction chamber 20 for the discharge of foamy molten glass 36 out of the SC melter 10. The discharged foamy molten glass 36 may, as shown, be introduced directly into a stilling vessel 38. The stilling vessel 38 includes a housing 40 that defines a holding compartment 42. The holding compartment 42 receives the foamy molten glass 36 that is discharged from the interior reaction chamber 20 of the SC melter 10 through the molten glass outlet 26 and maintains an intermediate pool 44 of the molten glass having a constant steady state volume (i.e., ±5 vol %). One or more impingement or non-impingement burners 46 may be mounted in the housing 40 of the stilling vessel 38 to heat the intermediate pool 44 of molten glass and/or suppress or destroy any foam that may accumulate on top of the pool 44 of molten glass. A constant or intermittent flow 48 of molten glass may be dispensed from the intermediate pool 44 of molten glass maintained in the holding compartment 42 and out of the stilling vessel 38 by a spout 50 appended to the housing 40. The spout 50 may have a reciprocal plunger 52 that is operable to controllably dispense the flow 48 of molten glass through an orifice plate 54 so that any downstream equipment, such as a glass finer, can receive a controlled input of molten glass. A more complete description of a stilling vessel that may receive the discharged foamy molten glass 36 is disclosed in U.S. Pub. No. 2021/0094857 (U.S. application Ser. No. 16/590,068), which is assigned to the assignee of the present invention and is incorporated herein by reference in its entirety. Of course, in other embodiments, the stilling vessel 38 may be omitted and the foamy molten glass 36 discharged from the interior reaction chamber 20 of the SC melter 10 may be introduced directly into a glass finer or elsewhere.

The exhaust vent 28 is preferably defined in the roof 14 of the housing 12 between the front end wall 18a and the rear end wall 18b at a location downstream from the feed material inlet 24. An exhaust duct 56 communicates with the exhaust vent 28 and is configured to remove gaseous compounds from the interior reaction chamber 20. The gaseous compounds removed through the exhaust duct 56 may be treated, recycled, or otherwise managed away from the SC melter 10 as needed. To help prevent or at least minimize the loss of some of the vitrifiable feed material 30 through the exhaust vent 28 as unintentional feed material castoff, a partition wall 58 that depends from the roof 14 of the housing 12 may be positioned between the feed material inlet 24 and the exhaust vent 28. The partition wall 58 may include a lower free end 60 that is submerged within the glass melt 22, as illustrated, or it may be positioned close to, but above, the glass melt 22. The partition wall 58 may be constructed similarly to the roof 14, the floor 16, and the surrounding upstanding wall 18, but it does not necessarily have to be so constructed.

The SC melter 10 includes one or more submerged burners 62. Each of the one or more submerged burners 62 is mounted in a port 64 defined in the floor 14 (as shown) and/or the surrounding upstanding wall 18 at a location immersed by the glass melt 22. Each of the submerged burner(s) 62 forcibly injects a combustible gas mixture G into the glass melt 22 through an output nozzle 66. The combustible gas mixture G comprises fuel and oxygen. The fuel supplied to the submerged burner(s) 62 is preferably methane or propane, and the oxygen may be supplied as pure oxygen, in which case the burner(s) 62 are oxy-fuel burners, or it may be supplied as a component of air or an oxygen-enriched gas that includes at least 20 vol % and, preferably, at least 50 vol % $O_2$. Upon being injected into the glass melt 22, the combustible gas mixture G immediately autoignites to produce combustion products 68—namely, $CO_2$, CO, $H_2O$, and any uncombusted fuel, oxygen, and/or other gas compounds such as nitrogen—that are discharged into and through the glass melt 22. Anywhere from five to thirty submerged burners 62 are typically installed in the SC melter 10 although more or less burners 62 may certainly be employed depending on the size and melt capacity of the melter 10.

The combustible gas mixture G is supplied to and injected from each of the submerged burner(s) 62 at a mass flow rate $MF_{Mix}$. The mass flow rate $MF_{Mix}$ of the combustible gas mixture G at each burner 62 comprises a mass flow rate of oxygen $MF_{Ox}$ and a mass flow rate of fuel $MF_{Fuel}$, which may be a mass flow rate of methane $MF_{Meth}$ or a mass flow rate of propane $MF_{Prop}$, plus mass flow rates of other gases such as nitrogen or another inert gas if the oxygen is supplied via air or an oxygen-enriched gas. In terms of supplying the submerged burner(s) 62 with the combustible gas mixture G at the appropriate overall mass flow rate $MF_{Mix}$ as well as the appropriate mixture of oxygen and fuel flow rates $MF_{Ox}$, $MF_{Fuel}$, each of the burner(s) 62 may be fluidly coupled to an oxidant (oxygen, oxygen-enriched gas, or air) supply manifold and a fuel supply manifold by a flow conduit that is equipped with sensors and valves to allow for precise control of the mass flow rates $MF_{Mix}$, $MF_{Ox}$, $MF_{Fuel}$ related to the combustible gas mixture G supplied to the burner(s) 62 and injected through the burner nozzle(s) 66.

During operation of the SC melter 10, and referring now specifically to FIG. 1, each of the one or more submerged burners 62 individually discharges combustion products 68 directly into and through the glass melt 22. The glass melt 22 is a volume of molten glass that often weighs between 1 US ton (1 US ton=2,000 lbs) and 100 US tons and is generally maintained at a constant volume during steady-state operation of the SC melter 10. As the combustion products 68 are thrust into and through the glass melt 22, which creates complex flow patterns and severe turbulence, the glass melt 22 is vigorously agitated and experiences rapid heat transfer and intense shearing forces. The combustion products 68 eventually escape the glass melt 22 and are removed from the interior reaction chamber 20 through the exhaust vent 28 along with any other gaseous compounds that may volatize out of the glass melt 22. Additionally, in some circumstances, one or more non-submerged burners (not shown) may be mounted in the roof 14 and/or the surrounding upstanding wall 18 at a location above the glass melt 22 to provide heat to the glass melt 22, either directly by flame impingement or indirectly through radiant heat transfer, and to also facilitate foam suppression and/or destruction.

While the one or more submerged burners 62 are being fired into the glass melt 22, the vitrifiable feed material 30 is controllably introduced into the interior reaction chamber 20 through the feed material inlet 24. The vitrifiable feed material 30 does not form a batch blanket that rests on top of the glass melt 22 as is customary in a conventional continuous melting furnace, but, rather, is rapidly disbanded and consumed by the turbulent glass melt 22. The dispersed vitrifiable feed material 30 is subjected to intense heat transfer and rapid particle dissolution throughout the glass melt 22 due to the vigorous melt agitation and shearing forces caused by the submerged burner(s) 62. This causes the feed material 30 to quickly mix, react, and become chemically integrated into the glass melt 22. However, the agitation and stirring of the glass melt 22 by the discharge of the combustion products 68 from the submerged burner(s) 62 also promotes bubble formation within the glass melt 22. Consequently, the glass melt 22 is foamy in nature and includes a homogeneous distribution of entrained gas bubbles. The entrained gas bubbles may account for 30 vol % to 60 vol % of the glass melt 22, which renders the density of the glass melt 22 relatively low, typically ranging from 0.75 gm/cm$^3$ to 1.5 gm/cm$^3$ or, more narrowly, from 0.99 gm/cm$^3$ to 1.3 gm/cm$^3$, for soda-lime-silica glass. The gaseous inclusions entrained within the glass melt 22 vary in size and may contain any of several gases including $CO_2$, $H_2O$ (vapor), $N_2$, $SO_2$, $CH_4$, CO, and volatile organic compounds (VOCs).

The vitrifiable feed material 30 is formulated in accordance with the present disclosure to be melt-reacted into the glass melt 22 contained within the interior reaction chamber 20 of the SC melter 10 and to ensure that the foamy molten glass 36 discharged from the interior reaction chamber 20 through the molten glass outlet 26 can produce flint glass articles that meet flint glass color specifications. Flint soda-lime-silica glass, for instance, is visually transparent when solidified to a room temperature (i.e., 25° C.) viscosity. The visual transparency of flint glass is demonstrated by a dominant wavelength that lies between 572 nm and 578 nm, a brightness above 50%, and a purity below 16%. These three color specifications are measurable by a UV-Vis spectrometer using the standard illuminant C, with a 2 degree observer and sample thickness of 38 mm, according to the method of ASTM E308 (the American Society of Testing Materials). Molten soda-lime-silica glass produced in the SC melter 10 that meets these color specifications when solidified can be refined, conditioned, and formed into glass containers downstream of the SC melter 10, as will be further described below in connection with FIG. 3, in addition to other finished glass articles.

The vitrifiable feed material 30 includes three main components: (1) a base glass portion; (2) an oxidizing agent; and (3) a decolorant. The base glass portion is a physical mixture of virgin raw materials and optionally flint cullet (i.e., recycled glass) that contributes the primary glass-forming oxides of the glass chemical composition of the melt 22 in the correct proportions. With regards to soda-lime-silica glass, the base glass portion contributes the necessary amounts of $SiO_2$, $Na_2O$, CaO, as set forth below in Table 1 in which weight percents are listed as a percentage of the total weight of the glass, along with any of the following optional oxides: $Al_2O_3$; MgO; and/or $K_2O$. For example, to achieve a soda-lime-silica flint glass chemical composition in the glass melt 22, the vitrifiable feed material 30 may include an $SiO_2$ contributor such as quartz sand (crystalline $SiO_2$), an $Na_2O$ contributor such as soda ash ($Na_2CO_3$), a CaO contributor such as limestone ($CaCO_3$), and an $Al_2O_3$ contributor such as feldspar or nepheline syenite in the quantities needed to provide the requisite proportions of $SiO_2$, $Na_2O$, CaO, and $Al_2O_3$ respectively, in the glass melt 22. The base glass portion may also include up to 80 wt % flint cullet, which meets the flint color specifications listed above, as a source of $SiO_2$, $Na_2O$, CaO, and $Al_2O_3$, if desired, with the remainder being entirely or mostly virgin raw materials.

TABLE 1

Glass Chemical Composition of Soda-Lime-Silica Flint Glass

| Component | Weight % | Raw Material Sources |
| --- | --- | --- |
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |

The base glass portion of the vitrifiable feed material 30 oftentimes contains iron impurities. These iron impurities, as mentioned above, can impart a color tint or hue to the glass when solidified that ranges from blue-green to yellow-green depending on the redox ratio of the glass. To help ensure the production of flint glass, the vitrifiable feed material 30 should contain low iron impurities so that the total iron content in the glass melt 22 expressed as $Fe_2O_3$ is 0.06 wt % or less, and preferably between 0.01 wt % and 0.06 wt %, depending on the strictness of the flint glass color standard being applied. A primary way in which low iron impurities can be achieved in the base glass portion, and thus the vitrifiable feed material 30, is by including low-iron quartz sand in the feed material 30, which can be readily acquired, and/or by including an increased proportion of flint cullet in the feed material 30 since the flint cullet already contains a low iron content as a result of its production history.

In addition to providing the glass melt 22 with a low iron content, the vitrifiable feed material 30 also helps to provide the glass melt 22 with a redox ratio of between 0.1 and 0.4. The redox ratio of the glass melt 22 is the ratio of $Fe^{2+}$ to total iron ($Fe^{2+}+Fe^{3+}$) as expressed by the equation $[(Fe^{2+})/(Fe^{2+}+Fe^{3+})]$. A redox ratio of between 0.1 and 0.4 shifts the color tint or hue attributable to any iron contained in the glass melt 22 away from blue-green and towards yellow-green, which is noteworthy since the yellow-green hue is easier to mask with the decolorant. The oxidizing agent included in the vitrifiable feed material 30 helps support the prescribed redox ratio of the glass melt 22. In particular, the oxidizing agent included in the vitrifiable feed material 30 is preferably a sulfate compound—such as sodium sulfate ($Na_2SO_4$ or salt cake) or calcium sulfate ($CaSO_4$ or gypsum)—that decomposes within the glass melt to release $SO_2$ and $O_2$, which, in turn, oxidizes the glass melt 22. To support the prescribed redox ratio and make it easier to decolorize the melt 22, that glass melt 22 preferably has a sulfate content as retained in the glass of between 0.08 wt % and 0.1 wt % as expressed as $SO_3$.

The composition of the vitrifiable feed material 30 needed to reach a retained sulfate content in the glass melt 22 of between 0.08 wt % and 0.1 wt % as expressed as $SO_3$ generally cannot be ascertained from feed material compositions devised for flint glass production in legacy continuous melting furnaces. This is most likely due to the completely different kinetic and chemical mechanisms occurring in the glass melt 22 of the SC melter 10, which is severely agitated by combustion products 68 that are discharged directly into and through the melt 22, compared to a molten glass bath of a legacy furnace that is heated radiantly from above and that flows slowly as a result of convective heat currents. In addition to discharging combustion products 68 directly into and through the glass melt 22 to generate a large volume percentage of bubbles in the glass melt 22—which bubbles primarily contain combustion product gases as opposed to batch reaction gases—the intimate shearing contact experienced between the combustion products 68 and the glass melt 22 are believed to input carbon species, such as $CO_2$ and CO, into the glass melt 22, possibly beyond saturation limits. It is also theorized that the intimate shearing contact between the combustion products 68 and the glass melt 22 may scavenge $O_2$ from oxygen-containing species within the melt 22 to assist with the combustion of the combustible gas mixture G injected by the submerged burner(s) 62. These gas-melt interactions are unique to submerged combustion melting and tend to frustrate sulfate solubility in the glass melt 22.

When operating the SC melter 10, it has been determined that the large quantity of bubbles generated within the glass melt 22 and the resultant high surface area of the melt/gas interface, the shearing forces experienced between the combustion products 68 and the melt 22, the infusion of carbon species into the melt 22, and the scavenging of $O_2$ out of the melt 22 all exacerbate the volatilization of sulfates from the melt 22. The increased volatilization of sulfates based on the inherent nature of submerged combustion melting—in particular the discharge of combustion products 68 directly into the glass melt 22—leads to the retention of less dissolved sulfates in the glass melt 22 while more $SO_2$ and $O_2$ is evolved. This means that the vitrifiable feed material 30 fed to the SC melter 10 needs to be overdosed with the sulfate compound to compensate for sulfate volatilization as compared to legacy feed material formulations tailored for the mechanics of a slow-moving and radiantly heated molten glass bath. To that end, the vitrifiable feed material 30 may be formulated to contain 0.20 wt % to 0.50 wt % of the sulfate compound, expressed as $SO_3$, based on the total weight of the vitrifiable feed material 30, which is about double of what is typically required in legacy feed material compositions to obtain the same retained sulfate content (i.e., 0.08 wt % and 0.1 wt % as expressed as $SO_3$) in the glass.

The decolorant included in the vitrifiable feed material 30 decolorizes the glass melt 22 (and consequently the glass of a formed glass article derived therefrom) by masking the yellow-green color tint in the glass melt 22 that may be imparted by the iron content. The decolorant may be selenium or manganese oxide. In one embodiment, the decolorant may be selenium, and in that case the selenium content in the glass melt 22 is preferably between 0.0001 wt % and 0.0003 wt %. And, like before with the sulfate oxidizing agent, the composition of the vitrifiable feed material 30 needed to reach that retained selenium content in the glass melt 22 generally cannot be ascertained from feed material compositions devised for flint glass production in legacy continuous melting furnaces. Similar to sulfates, selenium is susceptible to volatilization from the glass melt 22, mostly as a result of the large quantity of bubbles generated in the glass melt 22 and the accompanying high melt/gas interface, plus the shearing action between the combustion products 68 and the melt 22. In fact, selenium volatilization appears to be more aggressive than sulfate volatilization. To compensate for the higher volatilization of selenium as compared to legacy feed material formulations tailored for the mechanics of a slow-moving and radiantly heated molten glass bath, the vitrifiable feed material 30 may be formulated to contain 0.008 wt % to 0.016 wt % selenium based on the total weight of the vitrifiable feed material 30, which is approximately six to seven times more selenium than is typically required in legacy feed material compositions to obtain the same retained selenium content (i.e., 0.0001 wt % to 0.0003 wt %) in the glass.

In an alternative embodiment, the decolorant may be manganese oxide, and in that case the manganese oxide content in the glass melt 22 is preferably between 0.1 wt % and 0.2 wt %. Manganese oxide not only decolorizes the glass but also has an oxidizing effect. The use of manganese oxide as the decolorant can thus allow for an offsetting decrease in the amount of the oxidizing agent that needs to be included in the vitrifiable feed material 30 and retained in the glass melt 22 in order to maintain a redox ratio in the melt 22 of between 0.1 and 0.4, or it can shift the redox ratio downwardly towards the lower end of the 0.1 to 0.4 range in conjunction with the oxidizing agent if an offsetting decrease in the oxidizing agent is not implemented. Additionally, and in contrast to sulfates and selenium, manganese oxide is far less susceptible to volatilization in the glass melt 22. The amount of manganese oxide included in the vitrifiable feed material 30 is the same amount that will typically be retained in the glass melt 22. In that regard, the vitrifiable feed material 30 may be formulated to contain between 0.1 wt % and 0.2 wt % manganese oxide based on the total weight of the vitrifiable feed material 30 to achieve the same manganese content in the glass melt 22.

The amount of the selected decolorant included in the vitrifiable feed material 30 can vary within its specified range based on the amount of total iron (expressed as $Fe_2O_3$) present in the glass melt 22. As the iron content decreases, the respective quantities of selenium and manganese oxide that need to be retained in the glass melt 22 also decreases, and vice versa. When forming soda-lime-silica glass articles, for example, the glass chemical composition of the glass melt 22 includes $SiO_2$, $Na_2O$, $CaO$, and optionally $Al_2O_3$, plus retained sulfates, as explained above, and also includes either selenium or manganese oxide with the exact minimal amount of the selenium or manganese oxide needed to mask the color tint attributable to iron being variable based on the iron content of the glass melt 22. In the two tables below, an exemplary glass chemical composition for soda-lime-silica glass is disclosed at various total iron contents along with retained sulfate ($SO_3$ in glass) content and either retained selenium content (Se in glass; Table 2) or retained manganese oxide (MnO; Table 3) content. In addition, the two tables also recite the amount of sulfate compound ($SO_3$ input) and the amount of selenium (Se input; Table 2) or manganese oxide (MnO; Table 3) included in the vitrifiable feed material that have been shown to arrive at the retained sulfate and selenium/manganese oxide contents of the glass.

TABLE 2

Exemplary Glass Chemical Composition with Se as Decolorant

| | Weight Percent (wt %) | | |
| --- | --- | --- | --- |
| Component | Total Iron (as $Fe_2O_3$) of 0.04 | Total Iron (as $Fe_2O_3$) of 0.05 | Total Iron as ($Fe_2O_3$) of 0.06 |
| $SiO_2$ | | 73.0-73.4 | |
| $Na_2O$ | | 13.1-13.4 | |
| CaO | | 11.3-11.4 | |
| $Al_2O_3$ | | 1.42-1.44 | |
| $SO_3$ in glass | | 0.08-0.1 | |
| Se in glass | | 0.0001-0.0003 | |
| $SO_3$ input | | 0.21-0.44 | |
| Se input | 0.0085 | 0.0119 | 0.0154 |

TABLE 3

Exemplary Glass Chemical Composition with MnO as Decolorant

| | Weight Percent (wt %) | | |
| --- | --- | --- | --- |
| Component | Total Iron (as $Fe_2O_3$) of 0.04 | Total Iron (as $Fe_2O_3$) of 0.05 | Total Iron as ($Fe_2O_3$) of 0.06 |
| $SiO_2$ | | 73.0-73.4 | |
| $Na_2O$ | | 13.1-13.4 | |
| CaO | | 11.3-11.4 | |
| $Al_2O_3$ | | 1.42-1.44 | |
| $SO_3$ in glass | | 0.08-0.1 | |
| MnO in glass | | 0.1-0.2 | |
| $SO_3$ input | | 0.21-0.44 | |
| MnO input | 0.12 | 0.15 | 0.18 |

The vitrifiable feed material 30 and the glass chemical composition of the glass melt 22 can thus be adapted for the production of flint glass articles in a way that is more conducive to the peculiar manner in which the feed material 30 is melted and intermixed within the SC melter 10 while being exposed to high shearing combustion products 68 discharged directly into the melt 22. Indeed, the composition of the vitrifiable feed material 30 can render the glass melt 22 colorless or nearly colorless within tight color specifications while affording the same quality to the foamy molten glass 36 drawn from the glass melt 22 and any glass articles ultimately formed from the foamy molten glass 36. And while there is no specific manner in which the SC melter 10 must necessarily be operated, it has been found that controlling four operating conditions of the SC melter 10 to within certain parameters can help optimize the SC melter for reliable flint glass production. The four SC melter 10 operating conditions relevant here are (1) the oxygen-to-fuel ratio of the combustible gas mixture G supplied to each of the one or more submerged burners 62, (2) the temperature of the glass melt 22 maintained in the interior reaction chamber 20 of the SC melter 10, (3) the specific throughput rate of the foamy molten glass 36 discharged from the SC melter 10, and (4) the residence time of the glass melt 22.

For each of the one or more submerged burners 62, the oxygen-to-fuel ratio of the combustible gas mixture G refers to the ratio of the mass flow rate of oxygen $MF_{Ox}$ (whether that be a flow rate of pure oxygen or a flow rate of oxygen within a gas, such as air, that contains oxygen) to the mass flow rate of fuel $MF_{Fuel}$ within the mass flow rate $MF_{Mix}$ of the combustible gas mixture G relative to stoichiometry, as represented in the equation below.

$$\text{Oxygen-to-Fuel ratio} = \frac{MF_{Ox}}{MF_{Fuel}} \qquad \text{Eq. 1}$$

Stoichiometry is defined as the mass flow rate of oxygen $MF_{Ox}$ and the mass flow rate of the fuel $MF_{Fuel}$ that are theoretically needed to fully consume each of the oxygen and fuel flows in the combustion reaction without yielding an excess of either constituent. For example, if methane is used as the fuel, stoichiometry would dictate that the mass flow rate of oxygen $MF_{Ox}$ and the mass flow rate of methane $MF_{Meth}$ as combined in the combustible gas mixture G satisfy the relationship $MF_{Ox}=4.0(MF_{Meth})$. In another example, if propane is used as the fuel, stoichiometry would dictate that the mass flow rate of oxygen $MF_{Ox}$ and the mass flow rate of propane $MF_{Prop}$ as combined in the combustible gas mixture G satisfy the relationship $MF_{Ox}=3.63(MF_{Prop})$. The combustible gas mixture G injected from each of the submerged burners 62 may be at stoichiometry, may contain excess oxygen (lean) relative to stoichiometry, or may contain excess fuel (rich) relative to stoichiometry.

When supplying the submerged burner(s) 62 with excess oxygen or excess fuel, the oxygen-to-fuel ratio may be expressed as a percentage in excess of (or above) stoichiometry. For example, and returning to the examples above, operating the submerged burners 62 at 10% excess oxygen would mean that the mass flow rate of oxygen $MF_{Ox}$ at each of the burners 62 would be $MF_{Ox}=4.4(MF_{Meth})$ when the fuel is methane and $MF_{Ox}=3.99(MF_{Prop})$ when the fuel is propane. The oxygen-to-fuel ratio of the combustible gas mixture G supplied to each of the submerged burners 62 can be controlled by adjusting the flow rates of the oxygen and/or the fuel being supplied to the burners 62. Such adjustments can be performed through known automated control systems or by manual action. Here, in the presently disclosed method, the oxygen-to-fuel ratio of the combustible gas mixture G supplied to each submerged burner 62 may range from stoichiometry (i.e., 0% excess oxygen and 0% excess fuel) to 30% excess oxygen relative to stoichiometry or, more narrowly, from 15% excess oxygen to 25% excess oxygen relative to stoichiometry.

The temperature of the glass melt 22 refers to the bulk average temperature of the melt 22. This temperature can be determined in one of several ways. For instance, the temperature of the glass melt 22 may be determined by taking a plurality of temperature measurements throughout the glass melt 22 and then averaging those measurements to obtain an arithmetic mean temperature. Anywhere from two to ten temperature measurements may be taken from various distributed locations within the melt 22 and used to compile the bulk average temperature of the glass melt 22 in this way. Alternatively, the temperature of the glass melt 22 can be determined by taking a single temperature measurement at a location within the melt 22 that is known or has been deemed to reflect the bulk average temperature of the melt 22. And, still further, the bulk average temperature of the glass melt 22 may be determined indirectly through modeling or calculations based on other measured properties related to the glass melt 22. The temperature of the glass melt 22 is dependent on the total flow of the combustion products 68 into and through the glass melt 22 as well as the weight of the glass melt 22 and, accordingly, can be adjusted as needed by increasing or decreasing these parameters. In the presently disclosed method, the temperature of the glass melt 22 is controlled to range from 1200° C. to 1500° C. or, more narrowly, from 1330° C. to 1380° C. Excessive glass temperatures in the glass melt 22 can increase the volatization rate of certain species including, for example, selenium and sulfates, which may take the glass out of its flint color specification range alone or in combination with other glass properties.

The specific throughput rate of the molten glass 36 from the SC melter 10 refers to the quantity of foamy molten glass 36 discharged from the SC melter 10 in mass per unit of time per unit of cross-sectional area of the interior reaction chamber 20 at the height of the molten glass outlet 26. In other words, the specific throughput rate is the mass flow rate or mass throughput rate of the foamy molten glass 36 discharged from the SC melter 10 through the molten glass outlet 26 ($MF_{Discharged\ Glass}$), which may be reported in US tons per day (tons/day), divided by the cross-sectional area of the interior reaction chamber 20 at the height of the molten glass outlet 26 ($CA_{Melter}$), which may be reported in meters-squared (m$^2$), as represented in the equation below.

$$\text{Specific Throughput Rate} = \frac{MF_{Discharged\ Glass}}{CA_{Melter}} \qquad \text{Eq. 2}$$

$$\text{Typically reported in} \left(\frac{\text{Tons}}{\text{day} \times \text{m}^2}\right) \text{ or } (\text{tons/day/m}^2)$$

The units of the specific throughput rate of the foamy molten glass 36 are typically reported in tons/day/m$^2$ as indicated above and can easily be calculated from any other units of weight, time, and area by simple mathematical conversions. The specific throughput rate of the molten glass 36 can be adjusted upwardly or downwardly by increasing or decreasing, respectively, the mass flow rate of the foamy molten glass 36 being discharged from the SC melter 10 given a set cross-sectional area of the interior reaction chamber 20. To that end, when designing the SC melter 10, care should be taken to ensure that the cross-sectional area of the interior reaction chamber 20 is not too large or too small that the desired specific throughput rate of the molten glass 36 cannot be obtained using the intended range of mass flow rates for the discharged molten glass 36. In the presently disclosed method, the specific throughput rate of the foamy molten glass 36 being discharged from the SC melter 10 is controlled to range from 2 tons/day/m$^2$ to 25 tons/day/m$^2$ or, more narrowly, from 6 tons/day/m$^2$ to 12 tons/day/m$^2$.

The residence time of the glass melt 22 refers to the theoretical average amount of time a unit of weight of the glass melt 22 spends in the interior reaction chamber 20 before being discharged from the SC melter 10 as foamy molten glass 36. The residence time provides a rough indication of how long it takes for a unit of weight of the vitrifiable feed material 30 to become chemically integrated into and cycle through the glass melt 22 starting from the time the unit of feed material is introduced into the interior reaction chamber 20 to the time the unit of feed material is discharged from the chamber 20 as an equivalent unit of foamy molten glass 36. To calculate the residence time of the glass melt 22, the weight of the glass melt 22 ($W_{Glass\ Melt}$) contained within the interior reaction chamber 20 is divided by the mass flow rate of the foamy molten glass 36 being discharged from the SC melter 10 through the molten glass outlet 26 ($MF_{Discharged\ Glass}$) as represented below in equation (3).

$$\text{Residence Time} = \frac{W_{Glass\ Melt}}{MF_{Discharge\ Glass}} \qquad \text{Eq. 3}$$

The residence time of the glass melt 22 can be adjusted by increasing or decreasing the mass flow rate of the foamy molten glass 36 being discharged from the SC melter 10 and/or by increasing or decreasing the weight the glass melt 22 contained in the interior reaction chamber 20. In the presently disclosed method, the residence time of the glass melt 22 is controlled to range from 1 hour to 10 hours or, more narrowly, from 2 hours to 4 hours.

Referring still to FIG. 1, the foamy molten glass 36 discharged from the SC melter 10 through the molten glass outlet 26 is drawn from the glass melt 22 and is chemically homogenized to the desired glass chemical composition, e.g., a soda-lime-silica flint glass chemical composition, but with the same relatively low density and entrained volume of gas bubbles as the glass melt 22. The foamy molten glass 36 is eventually directed to additional downstream equipment—with or without first being collected in the holding compartment 42 of the stilling vessel 38—for additional processing into glass articles. The foamy molten glass 36 discharged from the SC melter 10 can be formed into glass articles that meet flint glass color specifications by subsequently fining and conditioning the foamy molten glass followed by forming the conditioned molten glass into a finished article. A preferred process for forming flint glass containers from the foamy molten glass 36 drawn from the glass melt 22 of the SC melter 10 is set forth in FIG. 3. Other processes may of course be employed to ultimately convert the discharged foamy molten glass 36 into finished flint glass articles.

Figure 3:
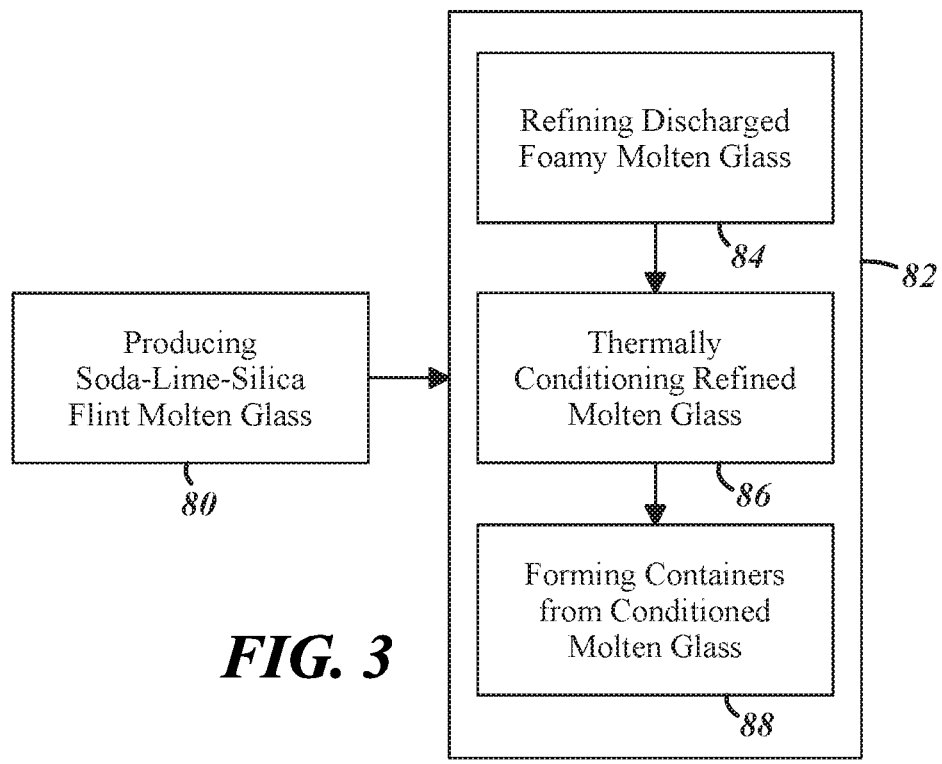
FIG. 3 is a schematic flow diagram of a process for producing flint glass using a submerged combustion melter and then forming glass containers from the flint glass according to one embodiment of the present disclosure.

Referring now to FIG. 3, the foamy molten glass 36 discharged from the SC melter 10, which can produce glass articles that meet the specifications for flint glass, may be further processed downstream of the SC melter 10. Specifically, the foamy molten glass 36 may have a soda-lime-silica flint glass chemical composition and be formed into glass containers. In FIG. 3, the step of producing molten glass having such a glass chemical composition, step 80, involves the use and operation of the SC melter 10, as described above, to provide the discharged foamy molten glass 36 for further processing, regardless of whether or not the discharged foamy molten glass 36 is temporarily held in the stilling vessel 38 after exiting the SC melter 10. Next, in step 82, the foamy molten glass 36 discharged from the SC melter 10 is formed into at least one, and preferably a plurality of, glass containers. The forming step 82 includes a refining step 84, a thermal conditioning step 86, and a forming step 88. These various sub-steps 84, 86, 88 of the forming step 82 can be carried out by any suitable practice including the use of conventional equipment and techniques.

The refining step 84 involves removing gas bubbles, including seeds, and other gaseous inclusions from the foamy molten glass 36 so that the glass containers formed therefrom do not contain more than a commercially-acceptable amount of visual glass imperfections. To carry out such refining, the foamy molten glass 36 may be introduced into a molten glass bath contained within a fining chamber of a finer tank. The molten glass bath flows from an inlet end of the finer tank to an outlet end and is heated along that path by any of a wide variety of burners—most notably, flat flame overhead burners, sidewall pencil burners, overhead impingement burners, etc.—to increase the viscosity of the molten glass bath which, in turn, promotes the ascension and bursting of entrained gas bubbles. In many cases, the molten glass bath in the fining chamber is heated to a temperature between 1400° C. to 1500° C. Additionally, chemical fining agents, if included in the vitrifiable feed material 30, may further facilitate bubble removal within the molten glass bath. The sulfate compound added to the vitrifiable feed material 30 to support the prescribed redox ratio of the glass melt 22 may additionally function as a fining agent because it decomposes to form $SO_2$ and $O_2$. These gases readily ascend through the molten glass bath while collecting smaller entrained bubbles along the way. As a result of the refining process that occurs in the finer tank, the molten glass bath typically has a density that ranges from 2.3 gm/cm³ to 2.5 gm/cm³ for soda-lime-silica glass at the outlet end of the finer tank, thus refining the discharged foamy molten glass 36 into a refined molten glass.

The refined molten glass attained in the fining chamber is then thermally conditioned in the thermal conditioning step 86. This involves cooling the refined molten glass at a controlled rate to a temperature and viscosity suitable for glass forming operations while also achieving a more uniform temperature profile within the refined molten glass. The refined molten glass is preferably cooled to a temperature between 1050° C. to 1200° C. to provide conditioned molten glass. The thermal conditioning of the refined molten glass may be performed in a separate forehearth that receives the refined molten glass from the outlet end of the finer tank. A forehearth is an elongated structure that defines an extended channel along which overhead and/or sidewall mounted burners can consistently and smoothly reduce the temperature of the flowing refined molten glass. In another embodiment, however, the fining and thermal conditioning steps 84, 86 may be performed in a single structure that can accommodate both fining of the foamy molten glass 36 and thermal conditioning of the refined molten glass.

Glass containers are then formed from the conditioned molten glass in the forming step 88. In a standard container-forming process, the conditioned molten glass is discharged from a glass feeder at the end of the finer/forehearth as molten glass streams or runners. The molten glass runners are sheared into individual gobs of a predetermined weight. Each gob falls into a gob delivery system and is directed into a blank mold of a glass container forming machine. Once in the blank mold, and with its temperature still between 1050° C. and about 1200° C., the molten glass gob is pressed or blown into a parison or preform that includes a tubular wall. The parison is then transferred from the blank mold into a blow mold of the forming machine for final shaping into a container. Once the parison is received in the blow mold, the blow mold is closed and the parison is blown rapidly into the final container shape that matches the contour of the mold cavity using a compressed gas such as compressed air. Other approaches may of course be implemented to form the glass containers besides the press-and-blow and blow-and-blow forming techniques including, for instance, molding techniques.

The container formed within the blow mold has an axially closed base and a circumferential wall. The circumferential wall extends from the axially closed base to a mouth that defines an opening to a containment space defined by the axially closed base and the circumferential wall. The formed glass container is allowed to cool while in contact with the mold walls and is then removed from the blow mold and placed on a conveyor or other transport device. The glass container is then reheated and cooled at a controlled rate in an annealing lehr to relax thermally-induced strain and remove internal stress points. The annealing of the glass container involves heating the glass container to a temperature above the annealing point of the soda-lime-silica flint glass chemical composition, which usually lies within the range of 510° C. to 550° C., followed by slowly cooling the container at a rate of 1° C./min to 10° C./min to a temperature below the strain point of the soda-lime-silica glass flint glass chemical composition, which typically falls within the range of 470° C. to 500° C. The glass container may be cooled rapidly after it has been cooled to a temperature below the strain point. Moreover, any of a variety of coatings may be applied to the surface of the glass container either before (hot-end coatings) or after (cold-end coatings) annealing for a variety of reasons.

EXAMPLES

A number of flint glass production runs were carried out in accordance with the present disclosure to demonstrate that strict color glass specifications for flint glass could reliably be met. As shown below in examples 1-5, a vitrifiable feed material was prepared that included a soda-lime-silica base glass portion along with a sulfate compound to act as an oxidizing agent and either selenium or manganese oxide to act as a decolorant. The materials included in the vitrifiable feed material for each example and their respective amounts in kilograms are listed in the "Batch Recipe" table. Additionally, the composition of the glass melt (averaged across multiple samples) produced from the batch recipe including the weight percent of the melt components and the redox ratio of the melt is recited in the "Average Glass Composition" table. Finally, the color values of the glass (averaged across multiple samples) obtained from the glass melt are listed in the "Average Measured Color Value" table. As can be seen, in each of examples 1-5, flint glass was produced that satisfied the minimal specifications for flint glass set forth above; that is, a dominant wavelength that lies between 572 nm and 578 nm, a brightness above 50%, and a purity below 16%.

Example 1

| Batch Recipe | |
| --- | --- |
| Material | Weight (kg) |
| Sand | 351.7 |
| Soda Ash | 108 |
| Syenite | 27.1 |
| Limestone | 98.9 |
| Sulfate | 1.99 |
| Manganese Oxide | 1.47 |
| Flint Cullet | 500 |

| Average Glass Composition | |
| --- | --- |
| Component | Content (wt %) |
| $SiO_2$ | 74.2 |
| $Na_2O$ | 12.4 |
| CaO | 11.4 |
| $Al_2O_3$ | 1.4 |
| Total Iron as $Fe_2O_3$ | 0.036 |
| $SO_3$ | 0.09 |
| MnO | 0.14 |
| Average Glass Redox | 0.1 |

| Average Measured Color Values | |
| --- | --- |
| Dominant Wavelength | 573 nm |
| Purity | 10% |
| Brightness | 66% |

Example 2

| Batch Recipe | |
| --- | --- |
| Material | Weight (kg) |
| Sand | 349.3 |
| Soda Ash | 103.8 |
| Syenite | 28.2 |
| Limestone | 103.4 |
| Sulfate | 6 |
| Se mix (90 wt % Soda) | 1.19 |
| Flint Cullet | 500 |

| Average Glass Composition | |
| --- | --- |
| Component | Content (wt %) |
| $SiO_2$ | 73.6 |
| $Na_2O$ | 12.9 |
| CaO | 11.3 |
| $Al_2O_3$ | 1.4 |
| Total Iron as $Fe_2O_3$ | 0.055 |
| $SO_3$ | 0.09 |
| Se | 0.0001 |
| Average Glass Redox | 0.35 |

| Average Measured Color Values | |
| --- | --- |
| Dominant Wavelength | 572 nm |
| Purity | 12% |
| Brightness | 58% |

Example 3

| Batch Recipe | |
| --- | --- |
| Material | Weight (kg) |
| Sand | 349.3 |
| Soda Ash | 103.5 |
| Syenite | 28.2 |
| Limestone | 103.4 |
| Sulfate | 6 |
| Se mix (90 wt % Soda) | 1.54 |
| Flint Cullet | 500 |

| Average Glass Composition | |
| --- | --- |
| Component | Content (wt %) |
| $SiO_2$ | 73.6 |
| $Na_2O$ | 12.9 |
| CaO | 11.3 |
| $Al_2O_3$ | 1.4 |

-continued

| Average Glass Composition | |
|---|---|
| Component | Content (wt %) |
| Total Iron as $Fe_2O_3$ | 0.056 |
| $SO_3$ | 0.09 |
| Se | 0.0001 |
| Average Glass Redox | 0.35 |

| Average Measured Color Values | |
|---|---|
| Dominant Wavelength | 573 nm |
| Purity | 12% |
| Brightness | 58% |

Example 4

| Batch Recipe | |
|---|---|
| Material | Weight (kg) |
| Sand | 350.6 |
| Soda Ash | 105.5 |
| Syenite | 27.1 |
| Limestone | 104.1 |
| Sulfate | 1.99 |
| Se mix (90 wt % Soda) | 1.19 |
| Flint Cullet | 500 |

| Average Glass Composition | |
|---|---|
| Component | Content (wt %) |
| $SiO_2$ | 74.1 |
| $Na_2O$ | 12.7 |
| CaO | 11.5 |
| $Al_2O_3$ | 1.4 |
| Total Iron as $Fe_2O_3$ | 0.056 |
| $SO_3$ | 0.09 |
| Se | 0.0001 |
| Average Glass Redox | 0.4 |

| Average Measured Color Values | |
|---|---|
| Dominant Wavelength | 572 nm |
| Purity | 10% |
| Brightness | 53% |

Example 5

| Batch Recipe | |
|---|---|
| Material | Weight (kg) |
| Sand | 350.6 |
| Soda Ash | 105.5 |
| Syenite | 27.1 |
| Limestone | 104.1 |

-continued

| Batch Recipe | |
|---|---|
| Material | Weight (kg) |
| Sulfate | 1.99 |
| Se mix (90 wt % Soda) | 1.19 |
| Flint Cullet | 500 |

| Average Glass Composition | |
|---|---|
| Component | Content (wt %) |
| $SiO_2$ | 73.8 |
| $Na_2O$ | 12.7 |
| CaO | 11.5 |
| $Al_2O_3$ | 1.4 |
| Total Iron as $Fe_2O_3$ | 0.044 |
| $SO_3$ | 0.08 |
| Se | 0.0001 |
| Average Glass Redox | 0.2 |

| Average Measured Color Values | |
|---|---|
| Dominant Wavelength | 575 nm |
| Purity | 10% |
| Brightness | 66% |

There thus has been disclosed a method of producing flint molten glass using submerged combustion melting technology that satisfies one or more of the objects and aims previously set forth. The flint molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of producing flint glass using submerged combustion melting, the method comprising:
   preparing a vitrifiable feed material that includes a base glass portion that provides primary glass-forming oxides, an oxidizing agent comprising a sulfate compound, and a decolorant comprising either selenium or manganese oxide, wherein the vitrifiable feed material comprises between 0.20 wt % and 0.50 wt % of the sulfate compound, expressed as $SO_3$, and further comprises between 0.008 wt % and 0.016 wt % of selenium or between 0.1 wt % and 0.2 wt % of manganese oxide;
   introducing the vitrifiable feed material into a glass melt contained within a submerged combustion melter, the glass melt comprising a total iron content expressed as $Fe_2O_3$ in an amount ranging from 0.04 wt % to 0.06 wt % and having a redox ratio that ranges from 0.1 to 0.4, the submerged combustion melter including one or more submerged burners; and
   discharging combustion products from the one or more submerged burners directly into and through the glass melt to thereby agitate the glass melt while intermixing and melting the vitrifiable feed material into the glass melt.

2. The method set forth in claim 1, wherein the sulfate compound is sodium sulfate, and wherein the glass melt has a retained sulfate content of between 0.08 wt % and 0.1 wt % as expressed as $SO_3$.

3. The method set forth in claim 1, wherein the vitrifiable feed material is formulated to provide the glass melt with a soda-lime-silica glass chemical composition comprising 60 wt % to 80 wt % $SiO_2$, 8 wt % to 18 wt % $Na_2O$, and 5 wt % to 15 wt % CaO.

4. The method set forth in claim 1, further comprising:
discharging molten glass from the submerged combustion melter, the molten glass having a density that ranges from 0.75 gm/cm$^3$ to 1.5 gm/cm$^3$.

5. The method set forth in claim 4, further comprising:
forming at least one flint glass article from the molten glass, and wherein the flint glass article meets flint glass specifications of a dominant wavelength that lies between 572 nm and 578 nm, a brightness above 50%, and a purity below 16%.

6. The method set forth in claim 5, wherein forming at least one glass article comprises:
refining the molten glass discharged from the submerged combustion melter at a temperature between 1400° C. and 1500° C. to obtain refined molten glass, the refined molten glass having a density that ranges from 2.3 gm/cm$^3$ to 2.5 gm/cm$^3$;
thermally conditioning the refined molten glass to obtain a conditioned molten glass having a temperature between 1050° C. and 1200° C.; and
delivering a molten glass gob of the conditioned molten glass into a glass container forming machine and forming a glass container from the molten glass gob.

7. The method set forth in claim 4, comprising:
discharging the molten glass from the submerged combustion melter at a specific throughput rate that ranges from 2 tons per day per meter squared of cross-sectional area of the submerged combustion melter [tons/day/m$^2$] to 25 tons/day/m$^2$;
combusting a combustible gas mixture at each of the one or more submerged burners, the combustible gas mixture comprising fuel and oxygen and having an oxygen-to-fuel ratio ranging from stoichiometry to 30% excess oxygen relative to stoichiometry; and
maintaining a temperature of the glass melt between 1200° C. and 1500° C. and a residence time of the glass melt between 1 hour and 10 hours.

8. The method set forth in claim 7, wherein the oxygen-to-fuel ratio ranges from 15% excess oxygen relative to stoichiometry to 25% excess oxygen relative to stoichiometry, the temperature of the glass melt ranges from 1330° C. to 1380° C., the residence time of the glass melt ranges from 2 hours to 4 hours, and the specific throughput rate of the molten glass discharged from the submerged combustion melter ranges from 6 tons/day/m$^2$ to 12 tons/day/m$^2$.

9. A method of producing soda-lime-silica flint glass using submerged combustion melting, the method comprising:
introducing a vitrifiable feed material into a glass melt contained within a submerged combustion melter, the vitrifiable feed material including a base glass portion, which contributes $SiO_2$, $Na_2O$, and CaO to the glass melt, and either 0.008 wt % to 0.016 wt % of selenium or 0.1 wt % to 0.2 wt % of manganese oxide, the glass melt comprising a total iron content expressed as $Fe_2O_3$ in an amount ranging from 0.04 wt % to 0.06 wt % and having a redox ratio that ranges from 0.1 to 0.4;
discharging combustion products from one or more submerged burners directly into and through the glass melt to thereby agitate the glass melt while intermixing and melting the vitrifiable feed material into the glass melt;
discharging foamy molten glass from the submerged combustion melter, the foamy molten glass having a density that ranges from 0.75 gm/cm$^3$ to 1.5 gm/cm$^3$; and
forming at least one flint glass article from the foamy molten glass, wherein the flint glass article meets flint glass specifications of a dominant wavelength that lies between 572 nm and 578 nm, a brightness above 50%, and a purity below 16%.

10. The method set forth in claim 9, wherein the vitrifiable feed material further includes between 0.20 wt % and 0.50 wt % of a sulfate compound, expressed as $SO_3$, and wherein the glass melt has a retained sulfate content of between 0.08 wt % and 0.1 wt % as expressed as $SO_3$.

11. The method set forth in claim 9, wherein forming at least one glass article comprises:
refining the foamy molten glass discharged from the submerged combustion melter at a temperature between 1400° C. and 1500° C. to obtain refined molten glass, the refined molten glass having a density that ranges from 2.3 gm/cm$^3$ to 2.5 gm/cm$^3$;
thermally conditioning the refined molten glass to obtain a conditioned molten glass having a temperature between 1050° C. and 1200° C.; and
delivering a molten glass gob of the conditioned molten glass into a glass container forming machine and forming a glass container from the molten glass gob.

12. The method set forth in claim 9, comprising:
discharging the foamy molten glass from the submerged combustion melter at a specific throughput rate that ranges from 2 tons per day per meter squared of cross-sectional area of the submerged combustion melter [tons/day/m$^2$] to 25 tons/day/m$^2$;
combusting a combustible gas mixture at each of the one or more submerged burners, the combustible gas mixture comprising fuel and oxygen and having an oxygen-to-fuel ratio ranging from stoichiometry to 30% excess oxygen relative to stoichiometry; and
maintaining a temperature of the glass melt between 1200° C. and 1500° C. and a residence time of the glass melt between 1 hour and 10 hours.

13. The method set forth in claim 12, wherein the oxygen-to-fuel ratio ranges from 15% excess oxygen relative to stoichiometry to 25% excess oxygen relative to stoichiometry, the temperature of the glass melt ranges from 1330° C. to 1380° C., the residence time of the glass melt ranges from 2 hours to 4 hours, and the specific throughput rate of the foamy molten glass discharged from the submerged combustion melter ranges from 6 tons/day/m$^2$ to 12 tons/day/m$^2$.

14. The method set forth in claim 9, wherein the glass melt has a soda-lime-silica glass chemical composition comprising 60 wt % to 80 wt % $SiO_2$, 8 wt % to 18 wt % $Na_2O$, 5 wt % to 15 wt % CaO, and 2 wt % or less of $Al_2O_3$.

* * * * *